(12) United States Patent
Bruce-Smith

(10) Patent No.: US 10,230,945 B2
(45) Date of Patent: Mar. 12, 2019

(54) DYNAMIC LOADING AND DEPLOYMENT OF TEST FILES TO PREVENT INTERRUPTION OF TEST EXECUTION

(71) Applicant: Accenture Global Solutions Limited, Dublin (IE)

(72) Inventor: Jeremy Bruce-Smith, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 221 days.

(21) Appl. No.: 15/295,742

(22) Filed: Oct. 17, 2016

(65) Prior Publication Data

US 2018/0109781 A1 Apr. 19, 2018

(51) Int. Cl.
| | | |
|---|---|---|
| H04L 12/00 | (2006.01) | |
| H04L 13/00 | (2006.01) | |
| G06F 15/16 | (2006.01) | |
| H04N 17/00 | (2006.01) | |
| G06F 11/36 | (2006.01) | |
| H04L 1/00 | (2006.01) | |

(52) U.S. Cl.
CPC ......... H04N 17/00 (2013.01); G06F 11/3688 (2013.01); H04L 1/0076 (2013.01)

(58) Field of Classification Search
CPC ......... H04L 41/00; H04L 43/50; G06F 11/368
USPC .......................................... 717/124; 702/184
See application file for complete search history.

(56) References Cited

U.S. PATENT DOCUMENTS

| | | | |
|---|---|---|---|
| 5,412,756 A * | 5/1995 | Bauman ................. | G06N 5/043 706/45 |
| 6,343,300 B1 | 1/2002 | Suetake | |
| 6,671,699 B1 * | 12/2003 | Black ....................... | G06F 8/60 |
| 6,775,824 B1 | 8/2004 | Osborne, II et al. | |
| 6,889,159 B2 | 5/2005 | Klotz et al. | |
| 7,093,004 B2 * | 8/2006 | Bernardin ............... | G06F 9/505 707/999.1 |
| 7,222,147 B1 * | 5/2007 | Black .................. | H04L 41/0803 709/200 |
| 7,280,529 B1 * | 10/2007 | Black .................. | G06F 11/1433 370/352 |
| 7,526,410 B2 * | 4/2009 | Anastassopoulos .... | H04L 43/50 702/184 |
| 7,721,265 B1 | 8/2010 | Xu et al. | |
| 8,881,195 B2 | 11/2014 | Clements | |

(Continued)

OTHER PUBLICATIONS

European Search Report corresponding to EP Application No. 17195864.8, dated Feb. 28 2018, 8 pages.

(Continued)

*Primary Examiner* — Frantz Coby

(74) *Attorney, Agent, or Firm* — Harrity & Harrity, LLP

(57) ABSTRACT

A system may receive an instruction to execute a test represented by code in a test file. The system may initialize a first process instance associated with executing the test. The system may initialize a second process instance associated with loading the test file and executing the test. The second process instance may be different from the first process instance. The system may load the test file using the second process instance. The system may execute the test using the first process instance, the second process instance, and the test file without loading the test file into the first process instance. The system may update the test file during execution of the test without interrupting execution of the test.

20 Claims, 5 Drawing Sheets

(56) References Cited

U.S. PATENT DOCUMENTS

| | | |
|---|---|---|
| 9,462,338 B2 | 10/2016 | Bray et al. |
| 2004/0015762 A1 | 1/2004 | Klotz et al. |
| 2009/0300423 A1 | 12/2009 | Ferris |
| 2013/0002887 A1 | 1/2013 | Bruce-Smith |
| 2013/0347050 A1 | 12/2013 | Friel |
| 2015/0331779 A1* | 11/2015 | Subramaniam ....... G06F 11/368 717/124 |

OTHER PUBLICATIONS

Australian Search Report corresponding to AU Application No. 2017235993, dated Mar. 21, 2018, 5 pages.

* cited by examiner

DYNAMIC LOADING AND DEPLOYMENT OF TEST FILES TO PREVENT INTERRUPTION OF TEST EXECUTION

BACKGROUND

Device testing may include executing a program or application with the intent of finding bugs (e.g., errors or other defects) associated with a device under test. For example, device testing may involve the execution of program code to evaluate one or more properties of interest in the device under test. In general, these properties may indicate the extent to which the device under test meets particular design or development requirements, responds correctly to different inputs, performs functions within an acceptable time, is sufficiently usable, can be installed and run in its intended environment(s), or the like.

SUMMARY

According to some possible implementations, a system may include one or more processors to receive an instruction to execute a test represented by code in a test file. The one or more processors may initialize a first process instance associated with executing the test. The one or more processors may initialize a second process instance associated with loading the test file and executing the test. The second process instance may be different from the first process instance. The one or more processors may load the test file using the second process instance. The one or more processors may execute the test using the first process instance, the second process instance, and the test file without loading the test file into the first process instance. The one or more processors may update the test file during execution of the test without interrupting execution of the test.

According to some possible implementations, a method may include receiving, by a device, an instruction to execute a test represented by code in a test file. The method may include initializing, by the device, a first process instance associated with a first memory space for executing the test. The method may include initializing, by the device, a second process instance associated with a second memory space for loading the test file. The second process instance may be different from the first process instance. The second memory space may be different from the first memory space. The method may include loading, by the device, the test file into the second memory space without loading the test file into the first memory space. The method may include executing, by the device, the test using the first process instance, the second process instance, and the test file loaded into the second memory space. The method may include updating, by the device, the test file during execution of the test without interrupting execution of the test.

According to some possible implementations, a non-transitory computer-readable medium may store one or more instructions that, when executed by one or more processors, cause the one or more processors to receive an instruction to execute a test included in a test file. The one or more instructions may cause the one or more processors to initialize a first process instance and a second process instance associated with executing the test. The second process instance may be different from the first process instance. The one or more instructions may cause the one or more processors to load the test file using the second process instance without loading the test file into the first process instance. The one or more instructions may cause the one or more processors to execute the test using the first process instance, the second process instance, and the test file without loading the test file into the first process instance.

DETAILED DESCRIPTION

The following detailed description of example implementations refers to the accompanying drawings. The same reference numbers in different drawings may identify the same or similar elements.

A test system may be used to test a device under test (DUT), such as a set top box or another type of device. In some cases, a test may be performed by executing code stored in a test file, such as a dynamic-link library (DLL) file. A test may be updated (e.g., to correct errors, to correct bugs, to correct false positives, to correct false negatives, to increase test accuracy, etc.) by modifying code stored in the test file. However, if a test file is updated while a test associated with that test file is being executed, the update may force execution of the test to halt, or may require the test to be halted before the test file can be updated. In some cases, updating the test file may require access to a particular file folder, and information in that file folder may only be modifiable after halting execution of all tests.

Halting of test execution may be particularly likely and problematic if a test file includes multiple tests or lengthy tests that take a long amount of time to execute, thereby increasing the likelihood that the test file is updated while the test or tests are being executed. Furthermore, the test system may test multiple DUTs (e.g., in parallel), further increasing the chances that a test will be halted for at least one DUT when a test file is updated. Also, updating test files for multiple DUTs of the test system may be time-consuming and resource intensive, and may require a large quantity of separate log-ins or accesses to individually update a test server associated with each DUT (referred to herein as a secondary test server).

Implementations described herein permit a test file to be updated without halting or interrupting execution of a test associated with that test file. In this way, computing resources (e.g., processor resources, memory resources, etc.) may be conserved by reducing a quantity of tests performed and by reducing a quantity of tests that need to be re-performed. Furthermore, implementations described herein conserve computing resources by reducing a quantity of log-ins or accesses required for a global update of a test file across multiple test servers and/or DUTs.

Figure 1A:
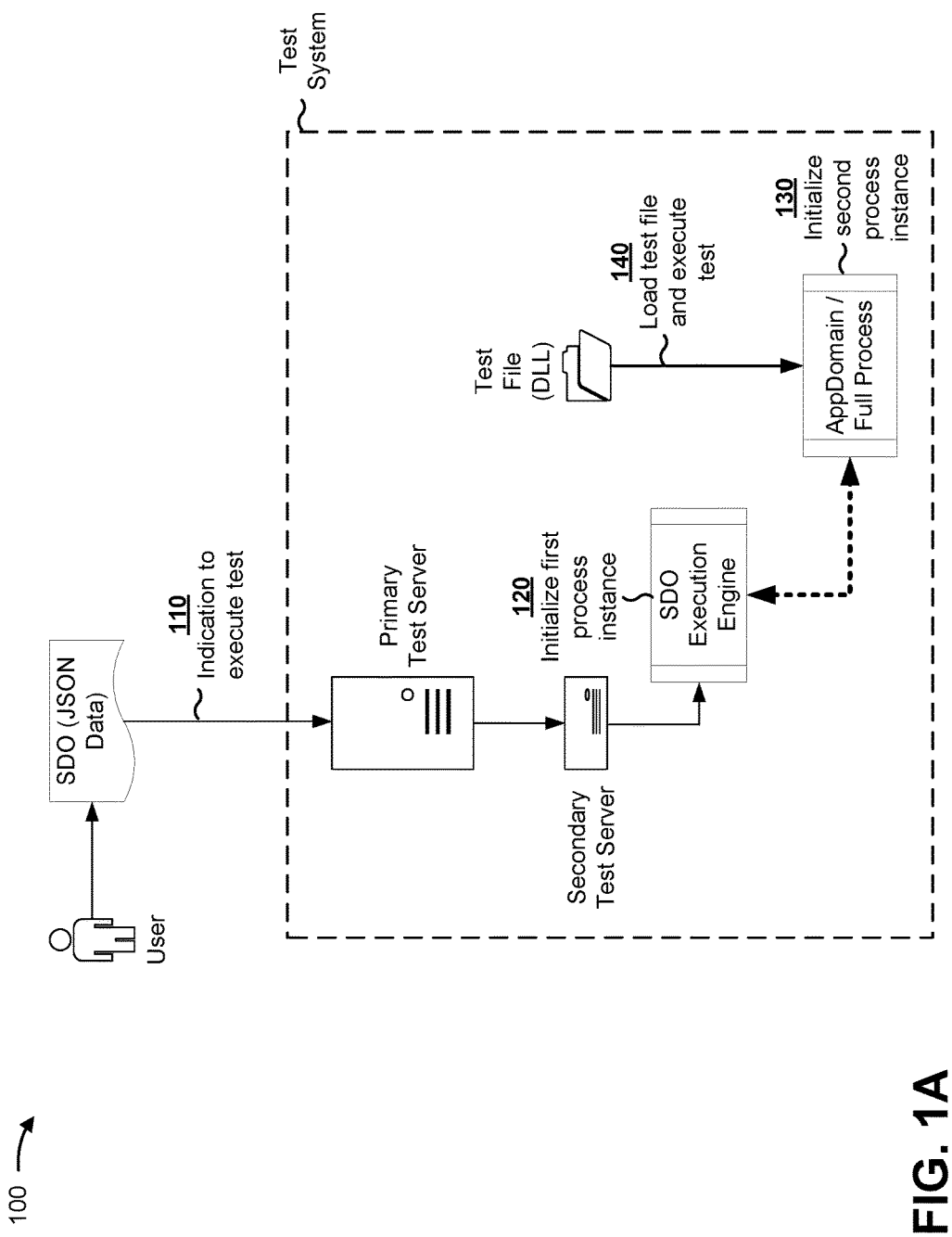
FIGS. 1A and 1B are diagrams of an overview of an example implementation described herein.
Figure 1B:
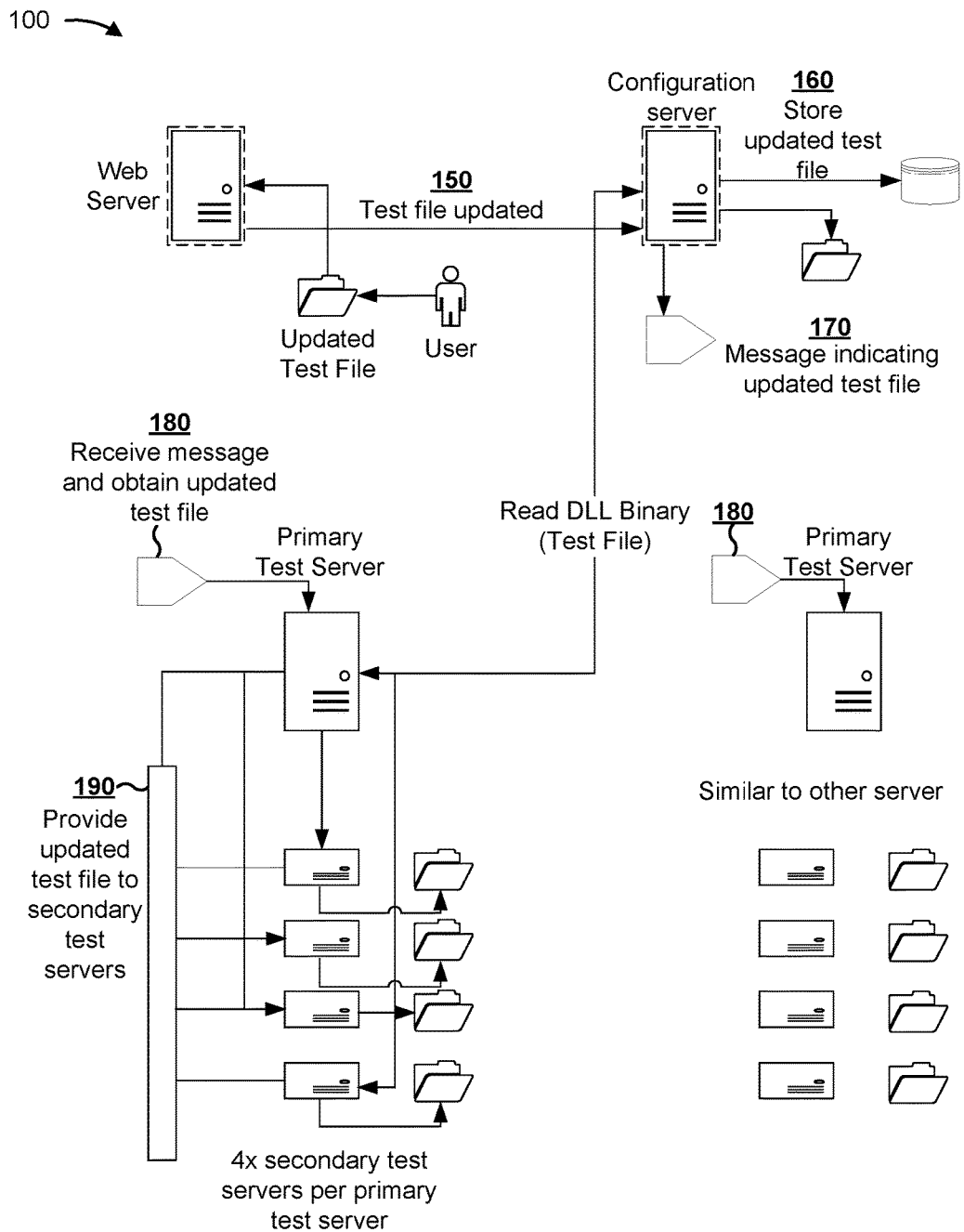

FIGS. 1A and 1B are diagrams of an overview of an example implementation 100 described herein. As shown in FIG. 1A, and by reference number 110, a primary test server (e.g., that communicates with one or more secondary test servers) may receive an indication to execute a test. For example, a user may interact with a client device to provide input to request execution of the test. In FIG. 1A, this input is shown as user selection of an object file (e.g., a screen definition object (SDO) file that includes structured data, such as JavaScript Object Notation (JSON) data), which may be sent from the client device to the primary test server. The object file may identify a test to be performed, and the test may be associated with a test file (e.g., a dynamic-link library (DLL) file). The primary test server may instruct a secondary test server to perform the test in association with a device under test.

As shown by reference number 120, based on receiving the instruction, the secondary test server may initialize a first process instance (e.g., a computing process or an instance of a computer program being executed). The first process instance may be associated with executing the test. For example, the first process instance may be an instance of an SDO execution engine that executes code for communicating with a device under test and/or for communicating with a second process instance to execute the test.

As shown by reference number 130, the secondary test server may initialize a second process instance. The second process instance may be associated with loading a test file, identified in the object file, that includes code for executing the test. For example, the second process instance may be an instance of a lightweight process (e.g., an AppDomain process) or a full process. As shown by reference number 140, the second process instance may load the test file (e.g., the DLL). The secondary test server may execute the test using the first process instance, the second process instance, and the test file without loading the test file into the first process instance. For example, the secondary test server may provide code (e.g., binary code or other code) stored in a memory location from the second process instance to the first process instance rather than directly providing the test file to the first process instance. Due to this separation, the test file will not be locked during execution of the test, and the test file can be updated without halting execution of the test. In this way, a quantity of tests or re-tests may be reduced, thereby conserving computing resources.

As shown in FIG. 1B, and by reference number 150, the test file may be updated. For example, the user may interact with a client device to update, add, or remove code included in the test file. The client device may send the updated test file to a web server, which may in turn send the updated test file to a configuration server. As shown by reference number 160, the configuration server may store the updated test file in a database. As shown by reference number 170, the configuration server may send a message indicating that a test file has been updated. In some implementations, the configuration server may broadcast this message to all primary test servers in communication with the configuration server.

As shown by reference number 180, the primary test server(s) may listen for and receive the message, and may obtain the updated test file (e.g., from the database). As shown by reference number 190, a primary test server may provide the updated test file to one or more secondary test servers connected to the primary test server (e.g., via a private network). The secondary test server(s) may store the updated test file without interrupting execution of a test associated with the test file that was updated, as described above in connection with FIG. 1A. In this way, a quantity of tests or re-tests may be reduced, thereby conserving computing resources. Furthermore, computing resources may be further conserved by reducing a quantity of log-ins or accesses required for a global update of a test file across multiple secondary test servers.

As indicated above, FIGS. 1A and 1B are provided merely as an example. Other examples are possible and may differ from what was described with regard to FIGS. 1A and 1B.

Figure 2:
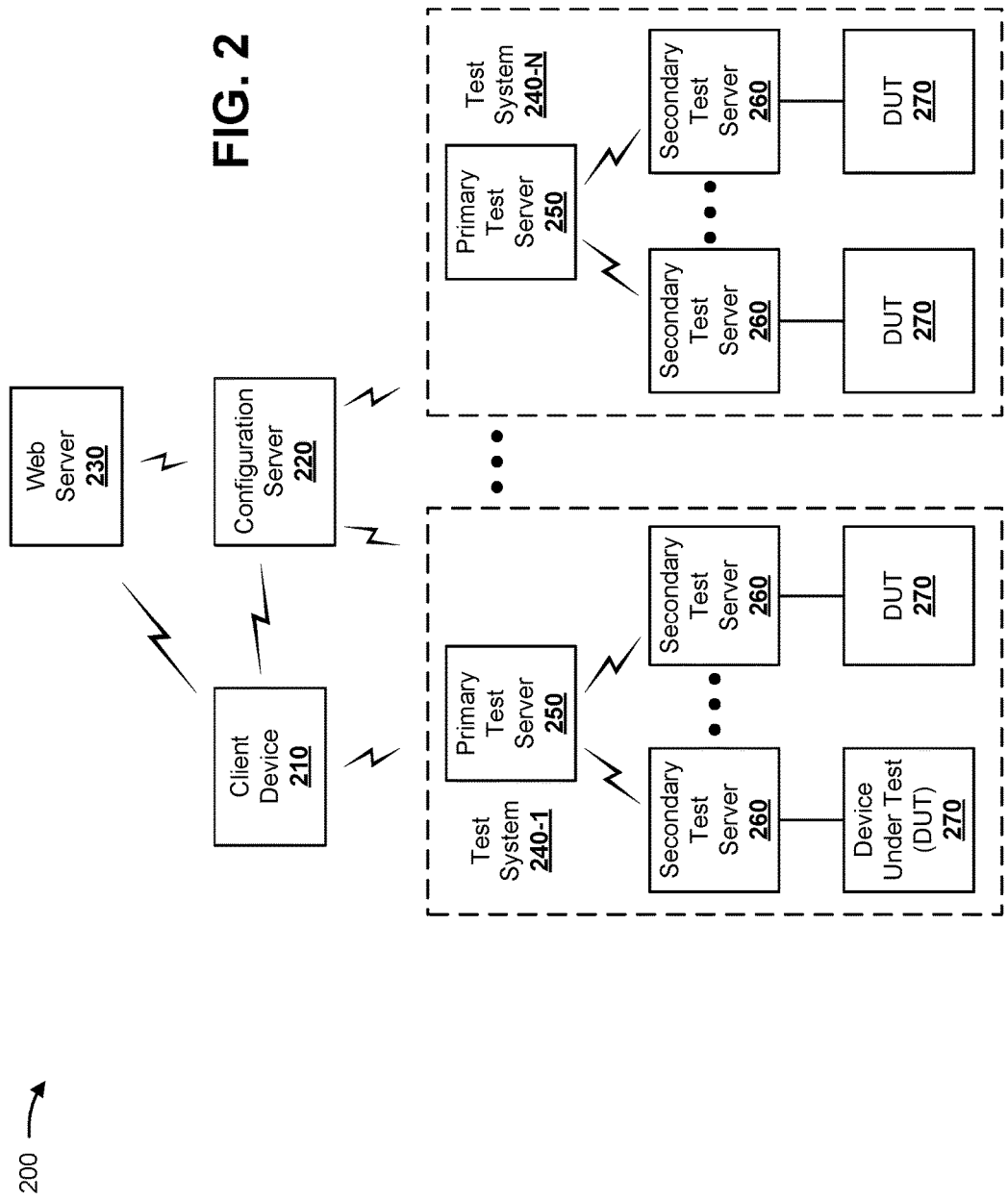
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a configuration server 220, a web server 230, one or more test systems 240-1 through 240-N (N≥1) (hereinafter referred to collectively as "test systems 240," and individually as "test system 240"), a set of primary test servers 250, a set of secondary test servers 260, and a set of devices under test (DUTs) 270. Devices of environment 200 may interconnect via wired connections, wireless connections, or a combination of wired and wireless connections.

Client device 210 includes one or more devices capable of receiving, generating, storing, processing, and/or providing information associated with device testing. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 210 may receive user input regarding device testing (e.g., an update to a test file or an instruction to execute a test), and may provide such input to one or more other devices of environment 200 (e.g., web server 230, configuration server 220, test system 240, etc.).

Configuration server 220 includes one or more devices capable of receiving, generating, storing, processing, and/or providing information associated with device testing. For example, configuration server 220 may include a server or a similar type of device. Configuration server 220 may receive (e.g., from client device 210 and/or web server 230) information regarding device testing (e.g., an update to a test file or an instruction to execute a test), and may provide such information to one or more test systems 240 (e.g., to primary test server 250). Additionally, or alternatively, configuration server 220 may store (e.g., locally or remotely) a data structure that indicates a relationship between a test file and a test file identifier that identifies the test file.

Web server 230 includes one or more devices capable of receiving, generating, storing, processing, and/or providing information associated with device testing. For example, web server 230 may include a server or a similar type of device. In some implementations, web server 230 may receive information regarding device testing from client device 210, and configuration server 220 may access such information from web server 230 (e.g., using a uniform resource identifier (URI), such as a uniform resource locator (URL)). In this way, configuration server 220 may be protected from direct access by client device 210, which improves the security of configuration server 220.

Test system 240 includes one or more devices and/or components that communicate to perform device testing. In some implementations, and as shown, test system 240 may include a primary test server 250, a set of secondary test servers 260, and a set of DUTs 270. As an example, a single test system 240 may include a single primary test server 250 that communicates via a private network with a set of secondary test servers 260 (e.g., one secondary test server 260, two secondary test servers 260, three secondary test servers 260, four secondary test servers 260, etc.). In some implementations, primary test server 250 may act as an intermediary between secondary test server(s) 260 and devices external to test system 240 to protect secondary test server(s) 260 from direct communication with devices external to test system 240. In other words, secondary test server 260 may communicate via a private network accessible only to primary test server 250, which improves security of secondary test server 260.

Within test system 240, a single secondary test server 260 may communicate with one or more DUTs 270 (e.g., via a high definition multimedia interface (HDMI) or another media interface) to facilitate testing of DUT(s) 270. In some implementations, a single secondary test server 260 may communicate with a single DUT 270 for device testing. Configuration server 220 may communicate with one or more test systems 240 (e.g., via primary test server(s) 250) to facilitate device testing.

Primary test server 250 includes one or more devices associated with performing device testing. For example, primary test server 250 may include a server or a similar type of device. Primary test server 250 may receive information regarding device testing from configuration server 220, and may provide such information to one or more secondary test servers 260 included in a test system 240 with primary test server 250.

Secondary test server 260 includes one or more devices associated with performing device testing. For example, secondary test server 260 may include a server or a similar type of device. Secondary test server 260 may receive information regarding device testing from primary test server 250, and may use such information to perform one or more tests on one or more DUTs 270. In some implementations, secondary test server 260 may provide one or more results of executing the test(s) to one or more devices of environment 200 (e.g., via primary test server 250). In some implementations, different secondary test servers 260 may be located remotely from one another.

DUT 270 includes one or more devices under test. For example, DUT 270 may include a set top box, a gaming device, a media device (e.g., capable of receiving and/or transmitting audio and/or video signals, audio and/or video data, etc.), a digital video recorder (DVR), or a similar type of device. Additionally, or alternatively, DUT 270 may include another type of device capable of being tested. In some implementations, secondary test server 260 may execute a test (e.g., code) to provide input to and/or request output from DUT 270, and DUT 270 may output information to secondary test server 260 as part of executing the test.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
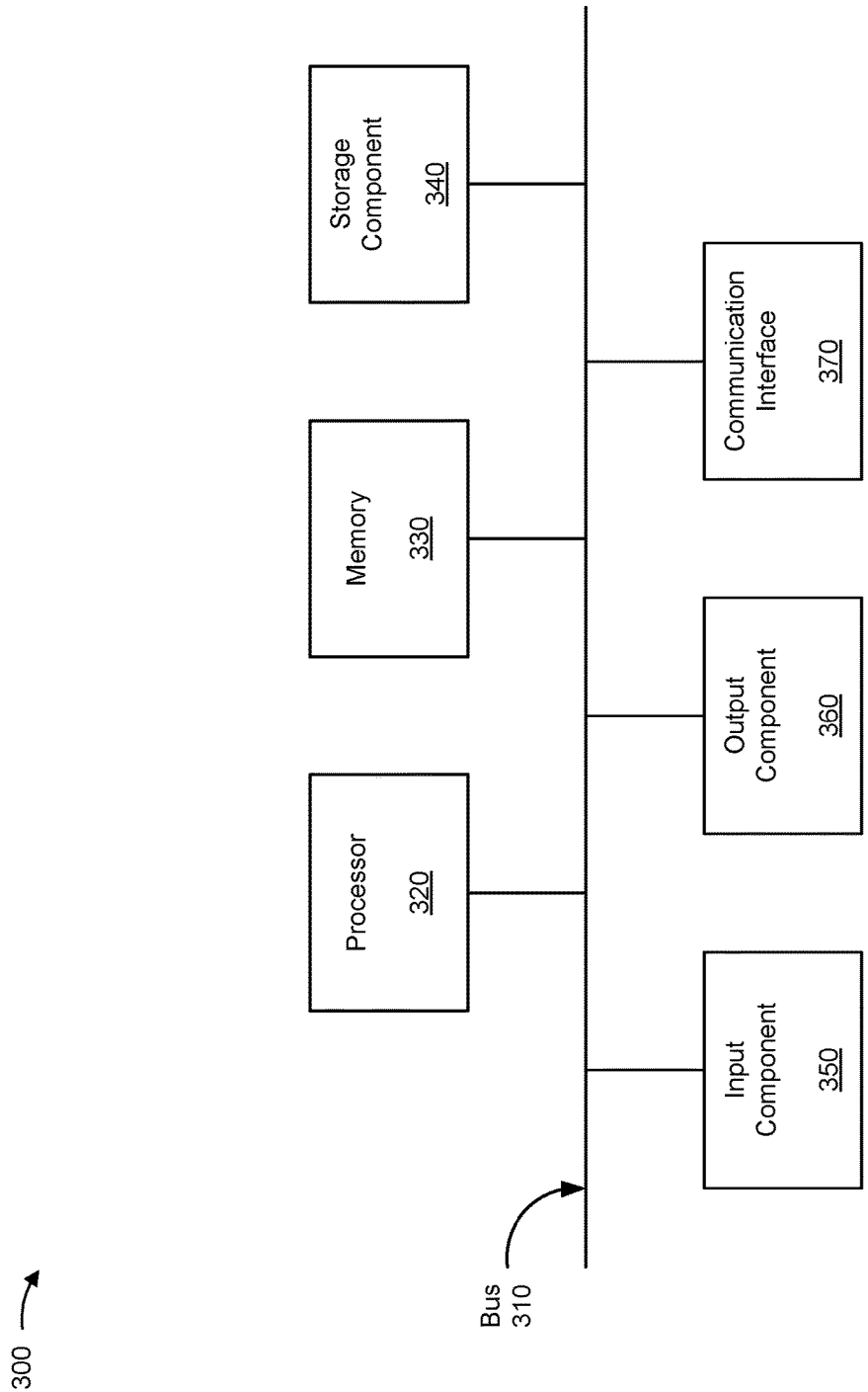
FIG. 3 is a diagram of example components of one or more devices of FIG. 2.

FIG. 3 is a diagram of example components of a device 300. Device 300 may correspond to client device 210, configuration server 220, web server 230, test system 240, primary test server 250, secondary test server 260, and/or DUT 270. In some implementations, client device 210, configuration server 220, web server 230, test system 240, primary test server 250, secondary test server 260, and/or DUT 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 may include a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
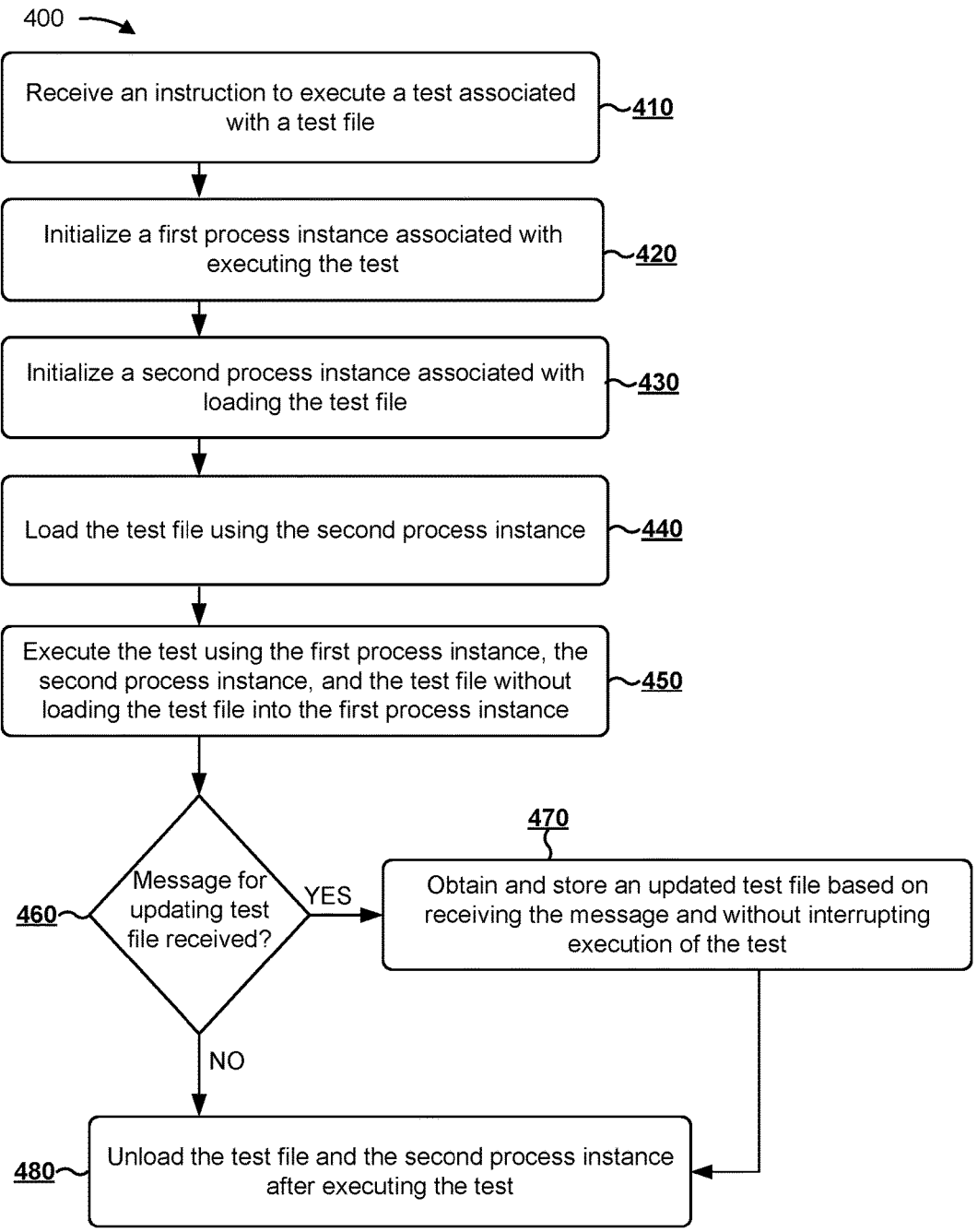
FIG. 4 is a flow chart of an example process for dynamic loading and deployment of test files to prevent interruption of test execution.

FIG. 4 is a flow chart of an example process 400 for dynamic loading and deployment of test files to prevent interruption of test execution. In some implementations, one or more process blocks of FIG. 4 may be performed by test system 240. In some implementations, one or more process blocks of FIG. 4 may be performed by another device or a group of devices separate from or including test system 240, such as client device 210, configuration server 220, web server 230, primary test server 250, secondary test server 260, and/or DUT 270.

As shown in FIG. 4, process 400 may include receiving an instruction to execute a test associated with a test file (block 410). For example, test system 240 may receive, from client device 210 and/or configuration server 220, an instruction to execute a test associated with a test file. In some implementations, primary test server 250 may receive the instruction based on user input provided via client device 210, and may provide the instruction to one or more secondary test servers 260 (e.g., on a private network with primary test server 250). In some implementations, the instruction may include an object file (e.g., a screen definition object (SDO) file, a file that includes text, a file that includes structured data, such as JSON data, etc.), and the test file may be identified in the object file. For example, the test file may be identified using a test file identifier (e.g., a character string, a filename, etc.) that identifies the test file and/or a version of the test file (e.g., using a version number). The test file (e.g., a DLL file) may include code to be executed to perform a test.

As an example, a user may interact with client device 210 to generate and/or modify an SDO file (e.g., a block of JSON data) that specifies one or more tests to be run. In some cases, the SDO file may include a custom test designed by the user. Client device 210 may send the SDO file to primary test server 250 (e.g., using an application programming interface (API), such as a Python API, a .NET API, or the like). Primary test server 250 may receive the SDO file and may send the SDO file to one or more secondary test servers 260 in communication with primary test server 250.

In some implementations, primary test server 250 may obtain a test file identified in the SDO file (e.g., from configuration server 220 and/or an associated database), and may provide the test file to secondary test server(s) 260. In some implementations, each secondary test server 260 may store a copy of the test file. For example, a particular secondary test server 260 may store the test file in a particular location (e.g., a particular file folder or directory associated with device testing) for use by the particular secondary test server 260 during device testing (e.g., testing of DUT 270 to analyze video data, audio data, and/or image data by comparing images, colors, text, sound, frames, etc.).

As further shown in FIG. 4, process 400 may include initializing a first process instance associated with executing the test (block 420), initializing a second process instance associated with loading the test file (block 430), and loading the test file using the second process instance (block 440). For example, based on receiving the instruction to execute the test, test system 240 (e.g., secondary test server 260) may initialize a first process instance (e.g., a computing process or an instance of a computer program being executed). The first process instance may be associated with executing the test, and may include first code (e.g., a function) for executing the test. For example, the first process instance may read an object file (e.g., an SDO file), and may execute one or more functions based on reading the object file. When executed, the first code may cause the first process instance to communicate with a second process instance that loads second code from a test file. When executed together, the first code and the second code may cause the test to be executed.

In addition to initializing the first process instance, test system 240 (e.g., secondary test server 260) may initialize a second process instance based on receiving the instruction to execute the test. The second process instance may load a test file, identified in the object file, from a particular location of secondary test server 260 (e.g., a particular file folder or directory). For example, secondary test server 260 may load the test file into a memory space of the second process instance without loading the test file into a memory space of the first process instance. The first process instance and the second process instance may be separate processes with separate execution threads.

As further shown in FIG. 4, process 400 may include executing the test using the first process instance, the second process instance, and the test file without loading the test file into the first process instance (block 450). For example, as indicated above, the test file may be loaded into the second process instance and not the first process instance. In this way, the test file may be updated without interrupting execution of the test. As an example, secondary test server 260 may prevent the test file from being loaded directly into a first memory space of the first process instance. Rather, secondary test server 260 may load the test file into a second memory space of the second process instance.

The first process instance and the second process instance may communicate to execute the test. For example, the first process instance may call one or more functions of the test file, loaded into the second process instance, to execute the test. The second process instance may provide data and/or code, stored in a block of memory associated with the test file, to the first process instance based on a request and/or a call from the first process instance (e.g., rather than directly providing the test file to the first process instance). Due to the separation of the test file from the first process instance, the test file is not locked from editing. Further, binary code associated with the test file can be updated on the file system of secondary test server 260 while the second process instance is using the test file (e.g., after the test file is loaded). In this way, test system 240 may prevent interruption of execution of the test.

As further shown in FIG. 4, process 400 may include determining whether a message for updating the test file has been received (block 460). For example, test system 240 may receive a message indicating that one or more test files have been updated. For example, a user may interact with client device 210 to update a test file (e.g., by modifying a DLL file, by creating a replacement DLL file, etc.). In some implementations, client device 210 may send the updated test file to configuration server 220. In some implementations, client device 210 may send the updated test file to web server 230. Configuration server 220 may monitor web server 230 for updates and request updates, or web server 230 may push updates to configuration server 220.

Configuration server 220 may store the updated test file (e.g., locally or remotely, using a data structure). Additionally, or alternatively, configuration server 220 may store information that indicates a relationship between a test file identifier and the test file. Configuration server 220 may use this information to identify and provide a test file to primary test server 250 when primary test server 250 requests the test file using a test file identifier.

Configuration server 220 may transmit a message indicating that a test file has been updated. For example, configuration server 220 may broadcast the message via a network to which a set of primary test servers 250 is connected. Primary test server(s) 250 may listen for and/or may subscribe to receive such messages from configuration server 220. In some cases, the message may indicate that a test file has been updated without identifying the particular test file that has been updated. In some cases, the message may identify the particular test file that has been updated (e.g., using a test file identifier). In either case, primary test server 250 may receive the message, and may obtain one or more updated test files, as described below.

As further shown in FIG. 4, process 400 may include obtaining and storing an updated test file based on receiving the message and without interrupting execution of the test (block 470). For example, test system 240 may obtain the updated test file. In some implementations, primary test server 250 may obtain a test file identifier (e.g., from the message), may send the test file identifier to configuration server 220. Configuration server 220 may look up the test file using the test file identifier, and may send the test file to primary test server 250.

In some implementations, the message may identify the particular test, and primary test server 250 may request the updated test file for the particular test. In this way, test system 240 may conserve computing resources and network resources as compared to requesting all test files.

In some implementations, primary test server 250 may request all test files, and test system 240 (e.g., primary test server 250 and/or secondary test server 260) may compare received test files with test files stored locally by secondary test servers 260. In this case, test system 240 may update test files that are different (e.g., test files that have been updated). In this way, test system 240 increases a likelihood of storing updated test files for all tests.

In some implementations, primary test server 250 may request test files that have been updated after a particular time (e.g., a time associated with a reboot, a shutdown, a failure, a periodic update, a last update, etc.). In this way, test system 240 may obtain updates for test files that are more likely to be out of date.

Once the updated test file is obtained, primary test server 250 may send the updated test file to one or more secondary test servers 260 managed by (e.g., connected to, in communication with, etc.) primary test server 250. Secondary test server 260 may store the updated test file (e.g., in a particular location associated with device testing). In some implementations, secondary test server 260 may replace a previous test file (e.g., currently being executed or previously executed) with the updated test file. In this way, computing resources may be conserved by reducing a quantity of log-ins or accesses to secondary test servers 260 by a user to individually update secondary test servers 260. Further, this update to test files stored by secondary test server(s) 260 may happen at any time without interrupting execution of tests that are executing, as described elsewhere herein.

As further shown in FIG. 4, process 400 may include unloading the test file and the second process instance after executing the test (block 480). For example, when test execution is complete, secondary test server 260 may unload the test file. Additionally, or alternatively, secondary test server 260 may unload (e.g., stop, exit, etc.) the second process instance. Additionally, or alternatively, secondary test server 260 may unload the first process instance. In some implementations, secondary test server 260 may send a result of the test to another device (e.g., client device 210 via primary test server 250). In this way, secondary test server 260 may conserve computing resources (e.g., memory resources, processor resources, etc.) by unloading processes that are not being used.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit a test file to be updated without halting or interrupting execution of a test associated with that test file. In this way, computing resources (e.g., processor resources, memory resources, etc.) may be conserved by reducing a quantity of tests performed and by reducing a quantity of tests that need to be re-performed. Furthermore, implementations described herein conserve computing resources by reducing a quantity of log-ins or accesses required for a global update of a test file across multiple test servers and/or DUTs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more memories; and
one or more processors, communicatively coupled to the one or more memories, to:
receive an instruction to execute a test represented by code in a test file;
initialize a first process instance associated with executing the test,
the first process instance being associated with a first memory space associated with the one or more memories;
initialize a second process instance associated with loading the test file and executing the test,
the second process instance being different from the first process instance, and
the second process instance being associated with a second memory space associated with the one or more memories;
load the test file using the second process instance;
execute, based on code stored in the second memory space and provided to the first process instance, the test using the first process instance, the second process instance, and the test file without loading the test file into the first process instance; and
update the test file, in the second memory space, during execution of the test, by the first process instance, without interrupting execution of the test.

2. The system of claim 1, where the one or more processors, when updating the test file, are to:
receive an updated test file that is an update to the test file; and
store the updated test file without interrupting execution of the test.

3. The system of claim 2, where the one or more processors are further to:
receive a message indicating that one or more test files have been updated;
request the one or more test files based on receiving the message; and
where the one or more processors, when receiving the updated test file, are to:
receive the updated test file based on requesting the one or more test files.

4. The system of claim 2, where the one or more processors, when storing the updated test file, are further to:
replace the test file with the updated test file without interrupting execution of the test.

5. The system of claim 1, where the one or more processors are included in a first test server that tests a first device under test; and
where the system further comprises:
a second test server that tests a second device under test; and
a primary test server that provides the instruction to execute the test to the first test server and the second test server.

6. The system of claim 5, where the first test server is located remotely from the second test server.

7. The system of claim 1, where the first process instance and the second process instance are associated with separate execution threads.

8. The system of claim 1, where the one or more processors are further to at least one of:
unload, based on determining that the execution of the test is complete, the test file;
unload, based on determining that the execution of the test is complete, the first process instance;
unload, based on determining that the execution of the test is complete, the second process instance; or
send, based on determining that the execution of the test is complete, a result of the test to another device.

9. A method, implemented by a device, comprising:
receiving, by the device, an instruction to execute a test represented by code in a test file;
initializing, by the device, a first process instance associated with a first memory space, of the device, for executing the test;
initializing, by the device, a second process instance associated with a second memory space, of the device, for loading the test file,
the second process instance being different from the first process instance,
the second memory space being different from the first memory space;
loading, by the device, the test file into the second memory space without loading the test file into the first memory space;
executing, by the device, the test using the first process instance, the second process instance, and the test file loaded into the second memory space, executing the test including:
providing code, stored in the second memory space, to the first process instance, and
executing the test based on providing the code stored in the second memory space to the first process instance; and
updating, by the device, the test file, in the second memory space, during execution of the test, by the first process instance, without interrupting execution of the test.

10. The method of claim 9, where updating the test file comprises:
receiving an updated test file that is an update to the test file; and
replacing, in the second memory space, the test file with the updated test file during execution of the test and without interrupting execution of the test.

11. The method of claim 9, where the instruction includes an object file that identifies the test file; and
where the method further comprises:
providing the object file to the first process instance.

12. The method of claim 9, further comprising:
loading first code into the first memory space;
loading second code from the test file into the second memory space; and
where executing the test comprises:
executing the first code;
providing, from the first process instance to the second process instance, a request for the second code based on executing the first code; and
providing, from the second process instance to the first process instance, the second code based on the request.

13. The method of claim 9, where the first process instance and the second process instance communicate to execute the test.

14. The method of claim 9, where the second process instance provides information from the test file to the first process instance to execute the test.

15. The method of claim 9, where the first process instance and the second process instance are associated with separate execution threads.

16. A non-transitory computer-readable medium storing instructions, the instructions comprising:
one or more instructions that, when executed by one or more processors, cause the one or more processors to:
receive an instruction to execute a test included in a test file;
initialize a first process instance and a second process instance associated with executing the test,
the first process instance being associated with a first memory space,
the second process instance being associated with a second memory space, and
the second process instance being different from the first process instance;
load the test file using the second process instance without loading the test file into the first process instance; and
execute, based on code stored in the second memory space and provided to the first process instance, the test using the first process instance, the second process instance, and the test file without loading the test file into the first process instance.

17. The non-transitory computer-readable medium of claim 16, where the one or more instructions, when executed by the one or more processors, further cause the one or more processors to:
receive an updated test file to replace the test file in the second memory space; and
replace the test file with the updated test file in the second memory space without interrupting execution of the test.

18. The non-transitory computer-readable medium of claim 16, where the test includes a test of video data.

19. The non-transitory computer-readable medium of claim 16, where the test includes a test of a set-top box.

20. The non-transitory computer-readable medium of claim 16, where the one or more instructions, when executed by the one or more processors, further cause the one or more processors to:
determine that execution of the test is complete; and
based on determining that execution of the test is complete, at least one of:
unload the test file,
unload the first process instance,
stop the second process instance, or
send a result of the test to another device.

* * * * *